UNITED STATES PATENT OFFICE.

HUGO HENKEL AND WALTER WEBER, OF DUSSELDORF, GERMANY, ASSIGNORS TO THE FIRM OF HENKEL & CIE., OF DUSSELDORF, GERMANY.

MANUFACTURE OF HYDROGEN PEROXID.

1,108,752.  Specification of Letters Patent.  Patented Aug. 25, 1914.

No Drawing.  Application filed June 16, 1913.  Serial No. 774,054.

*To all whom it may concern:*

Be it known that we, Dr. HUGO HENKEL, chemist, and Dr. WALTER WEBER, chemist, citizens of the German Empire, residing at Dusseldorf, Germany, have invented certain new and useful Improvements in Manufacture of Hydrogen Peroxid, of which the following is a specification.

For cathode manufacture of hydrogen peroxid in an electrolyte containing oxygen or oxygen-containing gases, a method has been previously claimed in the specification Ser. No. 766,091, dated 7th day of May, 1913, consisting in the supply of the said gases, as well as the electrolysis, taking place under a pressure higher than that of the atmosphere. Now we have found that it is not necessary to carry on the combination of oxygen with hydrogen on the cathode, but that it is also possible to produce hydrogen peroxid, by causing oxygen or oxygen-containing gases to act, in the presence of water, under pressure, on gaseous hydrogen in the presence of suitable catalytic agents.

According to our process, it is possible to produce synthetically hydrogen peroxid from its elements in paying quantities and of a concentration which is not weaker than that which is usual in the commercial product. It is produced by using pressures which are within the limits of industrial practice. As catalytic agents substances can be used which can chemically bind hydrogen in a suitable manner or dissolve it, thus for instance metals such as palladium, platinum, nickel and others. In place of pure oxygen and pure hydrogen, gas mixtures can also be used containing oxygen or hydrogen, which are free from gases having a disturbing catalytic effect. The process can be carried out at an ordinary temperature.

Compared with the prior process hereinbefore referred to, the present process has the great advantage that gaseous hydrogen is used which can be prepared by any desired process, separate from the process itself for instance hydrogen obtained as a by-product in various processes can be used. In that way, it is possible to avoid technical difficulties which naturally result when electrolysis has to be carried out in apparatus at a very high pressure. Moreover, the process can be more easily made a continuous one, as only the hydrogen peroxid solution produced is discharged, and water introduced, while no attention need be paid to the changes in concentration by electrolysis in the electrolyte solution. The chief point however is that the present process renders it possible to obtain directly pure hydrogen peroxid solutions, as it is not necessary to carry out the work in the solution of an electrolyte. This forms a considerable technical advance, for, as is well known, the purification of hydrogen peroxid solutions containing electrolytes, is difficult, tedious and therefore expensive.

Example: A porous clay pipe is impregnated in the known manner with a catalytic agent such as for instance palladium. The pipe is placed under water in a vessel which is under an excess of pressure of gaseous oxygen absorbed or dissolved in the water, so that the oxygen is in contact with the outside of the pipe. Into the interior of the porous pipe gaseous hydrogen is forced. The hydrogen then combines, in the presence of the catalytic agent, with the oxygen and forms hydrogen peroxid. A solution of hydrogen peroxid is produced, the concentration of which is not inferior to that used industrially. The solution of hydrogen peroxid can be continuously drawn off, and water replaced, so that the manufacture can go in a continuous manner.

If in place of pure oxygen oxygen-containing gas mixtures such as air are used, then the pressure must be raised in accordance with the smaller partial pressure of the oxygen.

We claim:—

1. Process for the manufacture of hydrogen peroxid from hydrogen and oxygen, consisting in causing gaseous oxygen to act under pressure, in the presence of water, on gaseous hydrogen in the presence of suitable catalytic agents.

2. Process for the manufacture of hydrogen peroxid from hydrogen and oxygen, consisting in causing oxygen containing gas-mixtures, which are free from gases having a disturbing catalytic effect, to act under pressure, in the presence of water, on gaseous hydrogen in the presence of suitable catalytic agents.

3. Process for the manufacture of hydrogen peroxid from hydrogen and oxygen, consisting in causing gaseous oxygen to act under pressure, in the presence of water, on hydrogen containing gas-mixtures, which are free from gases having a disturbing catalytic effect, in the presence of suitable catalytic agents.

4. Process for the manufacture of hydrogen peroxid from hydrogen and oxygen, consisting in causing oxygen containing gas-mixtures, which are free from gases having a disturbing catalytic effect, to act under pressure, in the presence of water, on hydrogen containing gas-mixtures, which are free from gases having a disturbing catalytic effect, in the presence of suitable catalytic agents.

5. Process for the manufacture of hydrogen peroxid from hydrogen and oxygen, consisting in causing gaseous oxygen to act under pressure, in the presence of water, on gaseous hydrogen in the presence of suitable catalytic agents, in admitting additional hydrogen as it is used, in constantly drawing off the solution of hydrogen peroxid and in supplying a corresponding amount of water.

In testimony whereof we have hereunto set our hands in presence of two subscribing witnesses.

HUGO HENKEL. [L. S.]
WALTER WEBER. [L. S.]

Witnesses:
  HELEN NUFER,
  ALBERT NUFER.